United States Patent
Chen et al.

(10) Patent No.: US 10,807,079 B2
(45) Date of Patent: Oct. 20, 2020

(54) OXIDATION CATALYST FOR A STOICHIOMETRIC NATURAL GAS ENGINE

(71) Applicant: Johnson Matthey Public Limited Company, London (GB)

(72) Inventors: Hai-Ying Chen, Wayne, PA (US); Joseph Fedeyko, Wayne, PA (US); Jing Lu, Wayne, PA (US); Arthur Reining, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/644,864

(22) Filed: Jul. 10, 2017

(65) Prior Publication Data

US 2018/0015446 A1    Jan. 18, 2018

Related U.S. Application Data

(60) Provisional application No. 62/361,004, filed on Jul. 12, 2016.

(51) Int. Cl.
*B01J 29/74* (2006.01)
*B01D 53/94* (2006.01)
(Continued)

(52) U.S. Cl.
CPC ........ *B01J 29/7415* (2013.01); *B01D 53/944* (2013.01); *B01D 53/945* (2013.01); *B01D 53/9459* (2013.01); *B01J 23/42* (2013.01); *B01J 23/44* (2013.01); *B01J 29/0354* (2013.01); *B01J 29/047* (2013.01); *B01J 29/12* (2013.01); *B01J 29/44* (2013.01); *B01J 29/74* (2013.01); *B01J 35/0073* (2013.01); *B01J 35/04* (2013.01); *B01J 37/0201* (2013.01); *B01J 37/0236* (2013.01); *B01J 37/0246* (2013.01);
(Continued)

(58) Field of Classification Search
None
See application file for complete search history.

(56) References Cited

U.S. PATENT DOCUMENTS

| 6,528,031 B1 | 3/2003 | Park et al. |
| 2008/0293990 A1 | 11/2008 | Stevenson et al. |

(Continued)

FOREIGN PATENT DOCUMENTS

| CA | 2142889 | 1/1995 |
| DE | 102012209852 A1 | 12/2013 |

(Continued)

OTHER PUBLICATIONS

BZA—What are zeolites? British Zeolite Association. pp. 1-3. http://www.bza.org/zeolites/ (Year: 2015).*
Yamagishi et al.; Defect Sites in Highly Siliceous HZSM-5 Zeolites: A Study Performed by Aiumination and IR Spectroscopy; J. Phys. Chem. 1991, 95, 872-877.

*Primary Examiner* — Walter D. Griffin
*Assistant Examiner* — Jelitza M Perez

(57) ABSTRACT

An oxidation catalyst for treating an exhaust gas produced by a stoichiometric natural gas (NG) engine comprising a substrate and a catalytic material for oxidising hydrocarbon (HC), wherein the catalytic material for oxidising hydrocarbon (HC) comprises a molecular sieve and a platinum group metal (PGM) supported on the molecular sieve, wherein the molecular sieve has a framework comprising silicon, oxygen and optionally germanium.

24 Claims, 3 Drawing Sheets

(51) Int. Cl.

| | |
|---|---|
| *B01J 37/08* | (2006.01) |
| *B01J 35/04* | (2006.01) |
| *B01J 37/02* | (2006.01) |
| *B01J 29/12* | (2006.01) |
| *B01J 23/42* | (2006.01) |
| *B01J 29/04* | (2006.01) |
| *B01J 23/44* | (2006.01) |
| *B01J 29/44* | (2006.01) |
| *B01J 29/035* | (2006.01) |
| *B01J 35/00* | (2006.01) |
| *F01N 3/10* | (2006.01) |
| *F02B 43/10* | (2006.01) |

(52) U.S. Cl.
CPC ............ *B01J 37/088* (2013.01); *F01N 3/101* (2013.01); *F02B 43/10* (2013.01); *B01D 53/9477* (2013.01); *B01D 2255/102* (2013.01); *B01D 2255/1021* (2013.01); *B01D 2255/2065* (2013.01); *B01D 2255/2073* (2013.01); *B01D 2255/2092* (2013.01); *B01D 2255/20738* (2013.01); *B01D 2255/20746* (2013.01); *B01D 2255/20753* (2013.01); *B01D 2255/20761* (2013.01); *B01D 2255/20784* (2013.01); *B01D 2255/30* (2013.01); *B01D 2255/50* (2013.01); *B01D 2255/904* (2013.01); *B01D 2255/9022* (2013.01); *B01D 2255/9032* (2013.01); *B01D 2257/7025* (2013.01); *B01D 2258/018* (2013.01); *B01J 35/0006* (2013.01); *B01J 2229/186* (2013.01); *F01N 2330/12* (2013.01); *F01N 2370/00* (2013.01); *F01N 2570/12* (2013.01); *F01N 2570/18* (2013.01); *F02B 2043/103* (2013.01); *Y02A 50/20* (2018.01); *Y02T 10/12* (2013.01)

(56) References Cited

U.S. PATENT DOCUMENTS

| | | | |
|---|---|---|---|
| 2009/0081099 | A1* | 3/2009 | Yuen .................... B01D 53/944 |
| | | | 423/245.3 |
| 2010/0175372 | A1* | 7/2010 | Lambert ........... B01D 53/9472 |
| | | | 60/297 |
| 2010/0180582 | A1 | 7/2010 | Mueller-Stach et al. |
| 2011/0271664 | A1 | 11/2011 | Boorse et al. |
| 2013/0336863 | A1 | 12/2013 | Soeger et al. |
| 2014/0005453 | A1 | 1/2014 | Khanmamedova et al. |
| 2014/0065042 | A1 | 3/2014 | Andersen et al. |
| 2014/0079616 | A1* | 3/2014 | Fedeyko ............. B01J 37/0244 |
| | | | 423/237 |
| 2014/0140911 | A1* | 5/2014 | Bergeal ................. B01J 23/002 |
| | | | 423/213.5 |
| 2015/0174564 | A1* | 6/2015 | Muller-Stach ........... B01J 23/44 |
| | | | 423/213.5 |
| 2015/0290587 | A1* | 10/2015 | Mikami .................. F01N 3/103 |
| | | | 422/171 |
| 2015/0315944 | A1* | 11/2015 | Devarakonda .......... F01N 3/101 |
| | | | 423/213.5 |
| 2016/0236147 | A1* | 8/2016 | Chen .................... B01D 53/944 |
| 2016/0367941 | A1* | 12/2016 | Gilbert .............. B01D 53/9468 |

FOREIGN PATENT DOCUMENTS

| | | |
|---|---|---|
| EP | 2921667 A1 | 9/2015 |
| WO | 9947260 A1 | 9/1999 |
| WO | 2011080525 A1 | 7/2011 |
| WO | 2011092519 A1 | 8/2011 |
| WO | 2012166868 A1 | 12/2012 |
| WO | 2014195685 A1 | 12/2014 |
| WO | 2016130272 A1 | 8/2016 |

* cited by examiner

OXIDATION CATALYST FOR A STOICHIOMETRIC NATURAL GAS ENGINE

CROSS REFERENCE TO RELATED APPLICATIONS

This application claims priority benefit to U.S. Provisional Patent Application No. 62/361,004 filed on Jul. 12, 2016, which is incorporated herein by reference.

FIELD OF THE INVENTION

The invention relates to an oxidation catalyst and to an exhaust system for treating an exhaust gas produced by a stoichiometric natural gas (NG) engine. The invention further relates to an apparatus or a vehicle comprising a stoichiometric natural gas (NG) engine, and to methods of treating an exhaust gas produced by a stoichiometric natural gas (NG) engine.

BACKGROUND TO THE INVENTION

Legislation restricting the amount of pollutants that may be emitted into the atmosphere is becoming increasingly strict. One category of pollutant that is legislated against by inter-governmental organisations throughout the world is unburned hydrocarbons (HCs).

Engines have been produced that are purpose-built for using NG as a fuel. It is also possible to modify existing internal combustion engines to use NG. Natural gas (NG) typically comprises a hydrocarbon (HC) gas mixture and small amounts of carbon dioxide ($CO_2$), hydrogen sulfide ($H_2S$), water vapour ($H_2O$) and nitrogen ($N_2$). The main component of NG is methane ($CH_4$), but relatively small amounts of ethane ($C_2H_6$), propane ($C_3H_8$) and other hydrocarbons are usually also present. The natural gas (NG) is typically used as a fuel in the form of either compressed natural gas (CNG) or liquefied natural gas (LNG). For vehicular applications, the use of CNG as a fuel is typically preferred over LNG because CNG generally has both lower production and storage costs compared to LNG. When NG is used as a fuel, the exhaust gas produced by the engine often contains significant quantities of methane (so-called "methane slip"). Methane is a potent greenhouse gas (GHG). Methane and ethane can be difficult to catalytically oxidise over a catalytic convertor.

Lean burn NG engines and stoichiometric NG engines are known in the art. The differences between the operating conditions of lean burn and stoichiometric NG engines produce exhaust gases having very different chemical compositions. In a lean burn NG engine combustion is performed in an excess of air and the exhaust gas produced contains significant quantities of air. In contrast, stoichiometric NG engines combust natural gas under stoichiometric conditions and the exhaust produced contains a greater proportion of unburnt hydrocarbons than for a lean burn NG engine. Different exhaust gas treatment strategies are required for a stoichiometric NG engine compared to a lean burn NG engine.

SUMMARY OF THE INVENTION

Three-way conversion (TWC) catalysts are commonly used to treat the exhaust gases produced by spark-ignition, gasoline engines operated under stoichiometric conditions. TWC catalysts may also be used to treat the exhaust gases produced by stoichiometric NG engines. Thus, a TWC catalyst may be used to treat any (1) carbon monoxide, (2) unburned methane ($CH_4$) and any other short chain hydrocarbons, and (3) oxides of nitrogen ($NO_x$) produced by a stoichiometric NG engine. However, conventional TWC catalysts often fail to oxidise a significant proportion of the $CH_4$ in the exhaust gas and there may be substantial $CH_4$ "slip".

The invention provides an oxidation catalyst for treating an exhaust gas produced by a stoichiometric natural gas (NG) engine. The oxidation catalyst comprises a substrate and a catalytic material for oxidising hydrocarbons (HCs), wherein the catalytic material comprises a molecular sieve and a platinum group metal (PGM) supported on the molecular sieve, wherein the molecular sieve has a framework comprising silicon, oxygen and optionally germanium.

The oxidation catalyst of the invention is for treating hydrocarbons in an exhaust gas produced by a stoichiometric natural gas (NG) engine.

It has unexpectedly been found that the oxidation catalyst of the invention can be used to treat hydrocarbons, particularly methane, under the exhaust gas conditions produced by a stoichiometric NG engine.

The catalytic material for oxidising hydrocarbons in the oxidation catalyst of the invention can achieve high methane/ethane conversion efficiency at relatively low temperatures compared to conventional oxidation catalysts. The catalytic material has good thermal stability and on-stream stability in the presence of the gas mixture and water vapour, and can show good tolerance toward sulfur. The catalytic material of the invention shows surprisingly good oxidative activity toward methane and/or ethane (abbreviated herein as "methane/ethane"). It may also have a low methane light-off temperature and/or a low ethane light-off temperature. To achieve satisfactory methane/ethane conversion activity, heating the catalytic material to high temperatures may not be necessary.

A further advantage provided by the catalytic material in the oxidation catalyst of the invention is that at relatively low temperatures (e.g. <500° C.), the on-stream activity in the presence of water vapour and does not decline as observed in alumina-supported catalysts. Another advantage is that it has good thermal stability, particularly under hydrothermal conditions (i.e. in the presence of water vapour). When the catalytic material is used at relatively high temperatures, the oxidative activity of the catalytic material toward methane/ethane does not significantly deteriorate.

An aspect of the invention relates to an oxidation catalyst comprising:
 a substrate having an inlet end and an outlet end;
 a first region comprising a catalytic material for oxidising ammonia ($NH_3$); and
 a second region comprising a catalytic material for oxidising hydrocarbon (HC);
 wherein the catalytic material for oxidising hydrocarbon (HC) comprises a molecular sieve and a platinum group metal (PGM) supported on the molecular sieve, wherein the molecular sieve has a framework comprising silicon, oxygen and optionally germanium; and
 the second region is arranged to contact the exhaust gas at the outlet end of the substrate and after contact of the exhaust gas with the first region. for treating an exhaust gas produced by a stoichiometric natural gas (NG) engine.

The oxidation catalyst of the above aspect is for treating ammonia and hydrocarbons in an exhaust gas produced by a stoichiometric natural gas (NG) engine.

Ammonia (NH$_3$) is formed under the conditions used to reduce NO$_x$ over the TWC catalyst. Any NH$_3$ that is produced can be difficult to treat using a downstream emissions control device, particularly in low oxygen environments (i.e. when the exhaust gas composition is "rich" to reduce NO$_x$).

Also provided by the invention is an exhaust system for treating an exhaust gas produced by a stoichiometric natural gas (NG) engine. The exhaust system comprises an oxidation catalyst of the invention.

The invention also relates to an apparatus. The apparatus comprises a stoichiometric natural gas (NG) engine and either an exhaust system of the invention or an oxidation catalyst of the invention. The apparatus is typically a vehicle.

A further aspect of the invention relates to a method of treating an exhaust gas produced by a stoichiometric natural gas (NG) engine comprising: passing an exhaust gas produced by the stoichiometric NG engine through an oxidation catalyst of the invention.

BRIEF DESCRIPTION OF THE DRAWINGS

FIG. 2 shows an oxidation catalyst (5) having a second region (3) at an outlet end of the catalyst, which is a zone comprising the catalytic material for oxidising HCs. There is also a first region (2) at an inlet end of the catalyst, which is a zone comprising a catalytic material for oxidising ammonia. Both the first region and the second region are directly disposed on a substrate (1).

FIG. 3 shows an oxidation catalyst (5) having a second zone (3) comprising the catalytic material for oxidising HCs. The second zone (3) is disposed on a first layer (2) comprising a catalytic material for oxidising ammonia. The first layer (2) is directly disposed on a substrate (1).

FIG. 4 shows an oxidation catalyst having a first zone (2) comprising a catalytic material for oxidising ammonia. The first zone (2) is disposed on a second layer (3), which comprises the catalytic material for oxidising HCs. The second layer (3) is directly disposed on a substrate (1).

DETAILED DESCRIPTION OF THE INVENTION

Figure 1:
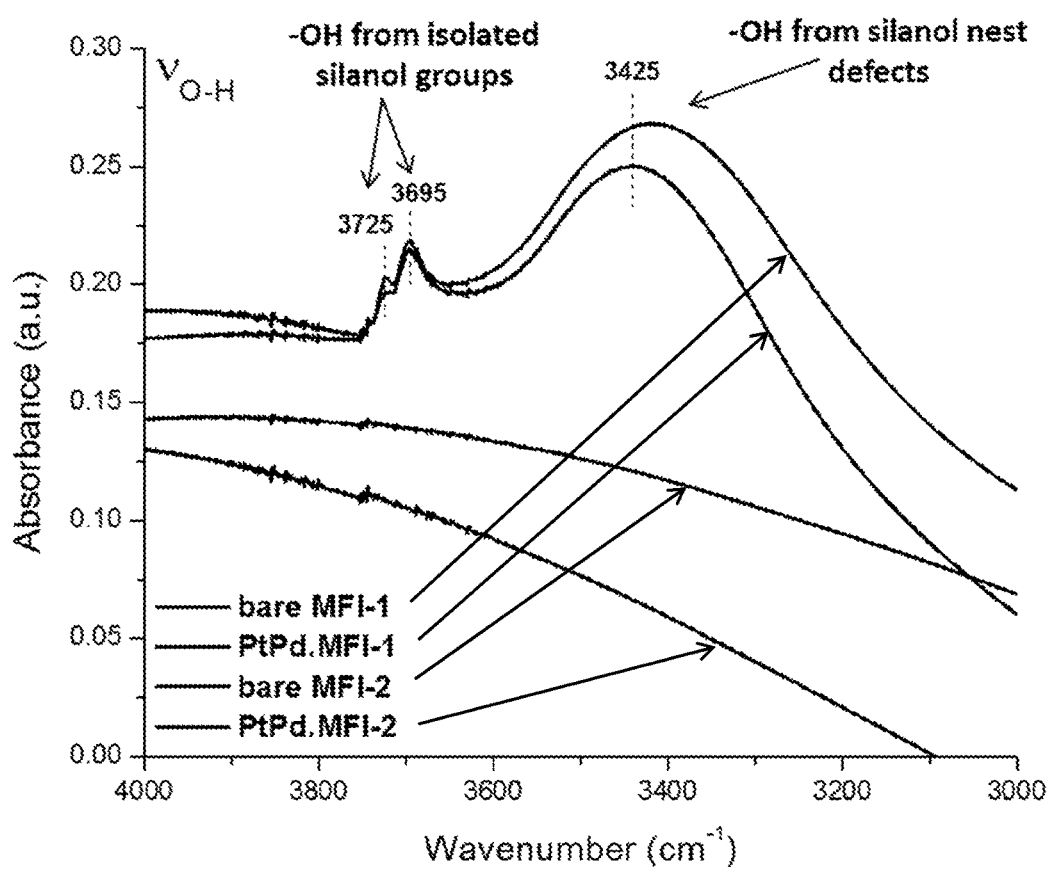
FIG. 1 shows transmission FTIR spectra in the —OH stretching region of bare MFI-1 and MFI-2 zeolites and the corresponding zeolites supporting Pt and Pd.

The invention provides an oxidation catalyst for treating an exhaust gas produced by a stoichiometric natural gas (NG) engine. The oxidation catalyst comprises a catalytic material for oxidising hydrocarbons (HCs), wherein the catalytic material comprises a molecular sieve and a platinum group metal (PGM) supported on the molecular sieve, wherein the molecular sieve has a framework comprising silicon, oxygen and optionally germanium.

The abbreviated expression "HC catalytic material" is used herein to represent the expression "catalytic material for oxidising hydrocarbons (HCs)".

The HC catalytic material comprises, or consists essentially of, a molecular sieve and a platinum group metal (PGM). The platinum group metal (PGM) is supported on the molecular sieve.

The molecular sieve is typically a crystalline molecular sieve, such as a zeolite.

Typically, the molecular sieve has a framework having a content of heteroatom T-atoms of about 0.20 mol %. As is known in the art, the term "T-atom" is an abbreviation for "tetrahedrally coordinated atom", which is present in the framework of the molecular sieve.

The term "heteroatom" as used herein in the context of "T-atoms" refers to atoms that are not silicon and not oxygen (i.e. non-silicon, non-oxygen heteroatoms), particularly atoms that are not silicon, not germanium and not oxygen (i.e. non-silicon, non-germanium, non-oxygen heteroatoms). The molecular sieve may have a framework that comprises one or more heteroatom T-atom. The heteroatom may, for example, be selected from the group consisting of aluminium (Al), boron (B), gallium (Ga), titanium (Ti), zinc (Zn), iron (Fe), vanadium (V) and combinations of any two or more thereof. More preferably, the heteroatom is selected from the group consisting of aluminium (Al), boron (B), gallium (Ga), titanium (Ti), zinc (Zn), iron (Fe) and combinations of any two or more thereof. For the avoidance of doubt, the heteroatom T-atoms cannot be germanium.

The molecular sieve may have a framework comprising silicon, oxygen, germanium and heteroatom T-atoms, and a content of heteroatom T-atoms is ≤ about 0.20 mol % (or as defined below). It may be preferable that the molecular sieve has a framework consisting essentially of silicon, oxygen, germanium and heteroatom T-atoms. More preferably, the molecular sieve may have a framework consisting essentially of silicon, oxygen and germanium (e.g. as the constituent atoms of the framework), wherein the amount of germanium is as defined below (e.g. the content of heteroatom T-atoms is 0.00 mol %).

When the molecular sieve has a framework comprising germanium, then typically the amount of germanium (e.g. germanium T-atoms) is ≤ about 10 mol %, preferably about 5 mol % and more preferably ≤ about 1 mol %.

The molecular sieve may have a framework comprising silicon, oxygen and heteroatom T-atoms, and a content of heteroatom T-atoms is ≤ about 0.20 mol % (or as defined below). It may be preferable that the molecular sieve has a framework consisting essentially of silicon, oxygen and heteroatom T-atoms (e.g. as the constituent atoms of the framework). More preferably, the molecular sieve may have a framework consisting essentially of silicon and oxygen (e.g. the content of heteroatom T-atoms is 0.00 mol %).

The molecular sieve may preferably have a content of heteroatom T-atoms of < about 0.17 mol %, more preferably ≤ about 0.15 mol %, such as < about 0.15 mol %, and even more preferably ≤ about 0.12 mol % (e.g. < about 0.12 mol %).

Typically, the molecular sieve may have a content of heteroatom T-atoms of ≥ about 0.001 mol %, preferably ≥ about 0.010 mol %, more preferably ≥ about 0.020 mol %.

In some instances, the molecular sieve does not have a content of heteroatom T-atoms (i.e. the molecular sieve does not comprise heteroatom T-atoms).

The molecular sieve may be microporous or mesoporous. In accordance with the IUPAC definitions of "microporous" and "mesoporous" (see *Pure & Appl. Chem.*, 66(8), (1994), 1739-1758), a microporous molecular sieve has pores with a diameter of less than 2 nm and a mesoporous molecular sieve has pores with a diameter of 2 nm to 50 nm.

The molecular sieve may be mesoporous. When the molecular sieve is a mesoporous molecular sieve, then typically the mesoporous molecular sieve may be selected from the group consisting of MCM-41, MCM-48, MCM-50, FSM-16, AMS, SBA-1, SBA-2, SBA-3, SBA-15, HMS, MSU, SBA-15 and KIT-1.

Typically, the molecular sieve, particularly when the molecular sieve is microporous, has a framework type selected from the group consisting of AEI, AFI, AFX, ANA, AST, ASV, ATS, BCT, BEA, BEC, BOF, BOG, BRE, CAN, CDO, CFI, CGS, CHA, -CHI, CON, CSV, DAC, DDR, DOH, DON, EAB, EDI, EEI, EMT, EON, EPI, ERI, ESV, ETR, EUO, -EWT, FAR, FAU, FER, GON, HEU, IFR, -IFU, IFW, IFY, IHW, IMF, IRN, IRR, -IRY, ISV, ITE, ITG, ITH, -ITN, ITR, ITT, -ITV, ITW, IWR, IWS, IWV, IWW, JNT, JOZ, KFI, LEV, LOV, LTA, LTF, MAZ, MEI, MEL, MEP, MER, MFI, MFS, MOR, MOZ, MRE, MSE, MSO, MTF, MTN, MTT, MTW, MVY, MWF, MWW, NAB, NES, NON, NSI, OBW, OFF, OKO, PAU, PCR, PHI, POS, PSI, RHO, -RON, RRO, RSN, RTE, RTH, RUT, RWR, RWY, SEW, SFE, SFF, SFG, SFH, SFN, SFS, SFV, SFW, SGT, SOD, SOF, SSF, -SSO, SSY, STF, STI, STO, STT, STW, -SVR, SVV, SZR, TON, TUN, UFI, UOS, UOV, UTL, UWY, VET, VNI and VSV. Each of the aforementioned three-letter codes represents a framework type in accordance with the "IUPAC Commission on Zeolite Nomenclature" and/or the "Structure Commission of the International Zeolite Association".

It is preferred that the molecular sieve is a zeolite. The zeolite may be referred to as a silica-containing zeolite, such as a siliceous zeolite.

The zeolite is typically selected from the group consisting of an aluminosilicate zeolite, a boro-aluminosilicate zeolite, a gallium aluminosilicate zeolite, a germanosilicate zeolite and a titaniosilicate zeolite. In each of these types of zeolite, the content of heteroatom T-atoms is as defined above. Thus, these zeolites are siliceous (i.e. high silica-containing) zeolites having a low content of heteroatom T-atoms, such as aluminium (Al), boron (B), gallium (Ga), and titanium (Ti) and optionally also zinc (Zn), iron (Fe).

| Siliceous zeolite or pure silica zeolite | Framework type | Siliceous zeolite or pure silica zeolite | Framework type |
|---|---|---|---|
| SSZ-24 | AFI | silicalite | MFI |
| octadecasil | AST | ZSM-5 | MFI |
| SSZ-55 | ATS | MCM-35 | MTF |
| zeolite beta | BEA | ZSM-39 | MTN |
| ITQ-14 | BEC | dodecasil-3c | MTN |
| CIT-5 | CFI | CF-4 | MTN |
| chabazite | CHA | ZSM-23 | MTT |
| SSZ-26 | CON | ZSM-12 | MTW |
| deca-dodecasil | DDR | ITQ-1 | MWW |
| dodecasil-1H | DOH | MCM-22 | MWW |
| UTD-1 | DON | SSZ-35 | MWW |
| EU-12 | ETL | nonasil | NON |
| EU-1 | EUO | RUB-41 | RRO |
| EMM-23 | *-EWT | RUB-3 | RTE |

-continued

| Siliceous zeolite or pure silica zeolite | Framework type | Siliceous zeolite or pure silica zeolite | Framework type |
|---|---|---|---|
| dealuminated zeolite-Y | FAU | RUB-10 | RUT |
| ferrierite | FER | RUB-24 | RWR |
| GUS-1 | GON | SSZ-73 | SAS |
| SSZ-42 | IFR | sigma-2 | SGT |
| ITQ-4 | IFR | sodalite trioxane | SOD |
| ITQ-32 | IHW | sodalite ethylene glycol | SOD |
| ITQ-7 | ISV | SSZ-61 | *-SSO |
| ITQ-3 | ITE | SSZ-35 | STF |
| ITQ-13 | ITH | ITQ-9 | STF |
| ITQ-12 | ITW | MU-26 | STF |
| ITQ-24 | IWR | SSZ-31 | *STO |
| ITQ-29 | LTA | SSZ-23 | STT |
| ZSM-11 | MEL | theta-1 | TON |

It is preferred that the zeolite is a siliceous zeolite, such as a pure silica zeolite. The siliceous zeolite or pure silica zeolite may be a zeolite selected from the tables above.

As is known in the art, a siliceous zeolite or pure silica zeolite has a framework comprising, or consisting essentially of, $SiO_4$ tetrahedra.

It is generally preferred that the molecular sieve, particularly when the molecular sieve is a zeolite, has a framework type selected from the group consisting of AEI, ANA, ATS, BEA, CDO, CFI, CHA, CON, DDR, ERI, FAU, FER, GON, IFR, IFW, IFY, IHW, IMF, IRN, -IRY, ISV, ITE, ITG, -ITN, ITR, ITW, IWR, IWS, IVW, IVWV, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, -SSO, SSY, STF, STO, STT, -SVR, SVV, TON, TUN, UOS, UOV, UTL, UWY, VET, VNI. More preferably, the molecular sieve or zeolite has a framework type selected from the group consisting of BEA, CDO, CON, MEL, MVWV, MFI and FAU, even more preferably the framework type is selected from the group consisting of BEA and MFI.

When a heteroatom T-atom is aluminium, the molecular sieve or zeolite may have a SAR of ≥1200. It may be preferable that the SAR is ≥1300, such as ≥1500 (e.g. ≥1700), more preferably ≥2000, such as ≥2200.

The zeolite may be selected from a small pore zeolite (i.e. a zeolite having a maximum ring size of eight tetrahedral atoms), a medium pore zeolite (i.e. a zeolite having a maximum ring size of ten tetrahedral atoms) and a large pore zeolite (i.e. a zeolite having a maximum ring size of twelve tetrahedral atoms).

Various methods are known in the art for preparing molecular sieves, particularly zeolites, with a high silica content (e.g. a high SAR), and a specific framework type and pore diameter. Numerous methods are also known for preparing a transition metal, such as a platinum group metal, supported on a zeolite. See, for example, WO 2012/166868.

In a first HC catalytic material embodiment, the molecular sieve or zeolite is a small pore molecular sieve or zeolite. The small pore molecular sieve or zeolite preferably has a framework type selected from the group consisting of AEI, AFX, ANA, CDO, CHA, DDR, EAB, EDI, EPI, ERI, IHW, ITE, ITW, KFI, LEV, MER, NSI, PAU, PHI, RHO, RTH, UFI and VNI. More preferably, the small pore molecular sieve or zeolite has a framework type that is CHA, CDO or DDR.

In a second HC catalytic material embodiment, the molecular sieve or zeolite is a medium pore molecular sieve or zeolite. The medium pore molecular sieve or zeolite preferably has a framework type selected from the group consisting of MFI, MEL, MWW and EUO. More preferably, the medium pore molecular sieve or zeolite has a framework type selected from the group consisting of MFI, MEL and MVWV, such as MFI.

In a third HC catalytic material embodiment, the molecular sieve or zeolite is a large pore molecular sieve or zeolite. The large pore molecular sieve or zeolite preferably has a framework type selected from the group consisting of AFI, CON, BEA, FAU, MOR and EMT. More preferably, the large pore molecular sieve or zeolite has a framework type selected from the group consisting of AFI, BEA, CON and FAU, such as BEA.

In general, the HC catalytic material of the invention may comprise a siliceous zeolite or a pure silica zeolite. It was surprisingly found that a HC catalytic material comprising such a zeolite can provide the advantages mentioned above. The HC catalytic material of the invention is particularly advantageous when the zeolite has an abundance of silanol groups.

It may be preferable that the molecular sieve, particularly when the molecular sieve is a zeolite, such as a siliceous zeolite or pure silica zeolite, comprises at least 0.010 mmol/g of silanol groups. More preferably, the molecular sieve comprises at least 0.020 mmol/g of silanol groups (e.g. at 0.030 mmol/g silanol groups). The amount of silanol groups can be measured using a K-uptake method, such as the K-uptake method described in the Examples. It has been found that when the molecular sieve, particularly the zeolite, contains a substantial number of silanol groups advantageous oxidation activity can be obtained.

The presence of silanol groups may be determined using FTIR spectroscopy.

The HC catalytic material of the invention may have an infrared spectrum comprising one or more absorption peak(s) [i.e. characteristic absorption peak(s) of the O—H stretching vibration] centered in a range of from 3000 cm$^{-1}$ to 3800 cm$^{-1}$. It is preferred that the infrared spectrum comprises one or more absorption peak(s) centered in a range of from 3000 cm$^{-1}$ to 3700 cm$^{-1}$, more preferably 3000 cm$^{-1}$ to 3600 cm$^{-1}$.

It may be preferable that the molecular sieve or zeolite comprises at least 0.010 mmol/g of silanol groups.

It is preferred that molecular sieve or zeolite comprises silanol groups, wherein the silanol groups have an on-set decomposition temperature ≥500° C. The on-set decomposition temperature can be measured by differential scanning calorimetry.

A molecular sieve or zeolite having silanol groups can be obtained by removal of organic templates during the synthesis of the molecular sieve or zeolite, by the removal of germanium from the framework by a post-synthesis treatment or by removal of hetero-atoms (e.g. Al, B, Ga, Zn, etc) from the molecular sieve or zeolite by a post-synthesis treatment. In some instances, the silanol groups may be an intrinsic part of the molecular sieve or zeolite framework.

Typically, the molecular sieve or zeolite is a solid. More preferably, the molecular sieve or zeolite is in a particulate form.

When the molecular sieve or zeolite is in a particulate form, then typically the molecular sieve or zeolite has a D50 of 0.1 to 20 microns (e.g. 5 to 15 microns), such as 0.2 to 15 microns (e.g. 0.2 to 10 microns or 7.5 to 12.5 microns). It is preferred that the D50 is 0.5 to 10 microns. For the avoidance of doubt, the D50 (i.e. median particle size) measurement can be obtained by Laser Diffraction Particle Size Analysis using, for example, a Malvern Mastersizer 2000. The measurement is a volume-based technique (i.e. D50 may also be referred to as $D_v50$ (or $D(v,0.50)$)) and applies a mathematical Mie theory model to determine a particle size distribution.

It has been found that when the molecular sieve or zeolite has a small particle size distribution (i.e. a lower D50), then the HC catalytic material has higher activity and hydrothermal durability than a HC catalytic material comprising a molecular sieve or zeolite having a larger particle size distribution. Without wishing to be bound by theory, it is believed that the silanol group sites of the molecular sieve or zeolite are more accessible to the platinum group metal as the particle size of the molecular sieve or zeolite decreases. The HC catalytic material may, however, show better durability when the molecular sieve or zeolite has a larger particle size distribution.

The HC catalytic material comprises a platinum group metal (PGM) supported on the molecular sieve. Typically, the platinum group metal (PGM) is selected from the group consisting of platinum (Pt); palladium (Pd); rhodium (Rh); a combination of platinum (Pt) and palladium (Pd); a combination of palladium (Pd) and rhodium (Rh); a combination of platinum (Pt) and rhodium (Rh); and a combination of platinum (Pt), palladium (Pd) and rhodium (Rh).

The platinum group metal (PGM) is preferably selected from the group consisting of platinum (Pt), palladium (Pd) and a combination of platinum (Pt) and palladium (Pd). It is further preferred that the platinum group metal is selected from the group consisting of palladium (Pd), and a combination of platinum (Pt) and palladium (Pd). The platinum group metal may be palladium (Pd). Alternatively, the platinum group metal (PGM) may be a combination of platinum (Pt) and palladium (Pd). Excellent oxidation activity may be obtained when the catalytic material comprises palladium (Pd).

When the platinum group metal (PGM) is a combination of platinum (Pt) and palladium (Pd), then the combination of Pt and Pd may be selected from the group consisting of separately supported Pt and Pd, a mixture of Pt and Pd, an alloy of Pt and Pd, and both a mixture and an alloy of Pt and Pd. When the PGM is separately supported Pt and Pd, then the particles of Pt and Pd are supported on separate sites of the molecular sieve. The mixture or alloy of Pt and Pd is preferably bimetallic.

Typically, the molecular sieve comprises the platinum group metal (i.e. as defined above) as the only transition metal, preferably the only platinum group metal (i.e. no other platinum group metals may be present other than those explicitly recited).

The HC catalytic material may preferably consist essentially of (i) a platinum group metal (PGM) and/or an oxide thereof; and (ii) a molecular sieve as defined herein; wherein the platinum group metal (PGM) is selected from the group consisting of platinum (Pt), palladium (Pd) and a combination of platinum (Pt) and palladium (Pd).

In general, the HC catalytic material may comprise a total amount of the platinum group metal (PGM), preferably a total amount of the platinum group metal (PGM) supported on the molecular sieve, of 0.01 to 30 wt %. It is preferred that the total amount of the PGM, particularly the total amount of the PGM supported on the molecular sieve, is 0.1 to 20 wt %, such as 0.2 to 15 wt %.

It may preferable that the total amount of the PGM (e.g. the total amount of PGM supported on the molecular sieve) is 6 to 30 wt %, more preferably 7.5 to 25 wt %, such as 10 to 20 wt %.

When the PGM comprises palladium (e.g. when palladium is present either singly or in combination with another metal), then the HC catalytic material typically comprises a total amount of palladium, preferably a total amount of palladium supported on the molecular sieve, of 0.01 to 20 wt % (e.g. 0.02 to 15 wt %). Preferably, the HC catalytic material comprises a total amount of palladium, particularly a total amount of palladium supported on the molecular sieve, of 0.1 to 15 wt %, such as 0.2 to 10 wt %. More preferably, the HC catalytic material comprises a total amount of palladium (e.g. the total amount of palladium supported on the molecular sieve) of 0.5 to 10 wt %, such as 0.75 to 7.5 wt %.

It may be preferable that the HC catalytic material typically comprises a total amount of palladium, preferably a total amount of palladium supported on the molecular sieve, of 4 to 20 wt % (e.g. 4.5 to 20 wt %), such as 5 to 17.5 wt %, more preferably 7.5 to 15 wt %.

The PGM is supported on the molecular sieve. The term "supported" in this context refers to PGM that is associated with the molecular sieve. Typically, the PGM is associated (e.g. as an ion-association or as a covalent association) with the silanol groups of the molecular sieve. Without wishing to be bound by theory, it is believed that the active PGM sites are associated with silanol groups, such as silanol nest sites, and/or terminal Si—OH (or Si—O$^-$) groups, which may be present on an external surface and/or within a cavity of the molecular sieve.

Some of the PGM may be located insides the pores of the molecular sieve. The HC catalytic material may have at least 1% by weight (i.e. of the amount of PGM of the HC catalytic material) of the PGM located inside pores of the molecular sieve, preferably at least 5% by weight, more preferably at least 10% by weight. The amount of PGM inside the pores of the molecular sieve can be determined using conventional techniques or by the method described in SAE 2013-01-0531.

The HC catalytic material may have ≤75% by weight (i.e. of the amount of PGM of the HC catalytic material) of the PGM located inside pores of the molecular sieve, preferably ≤50% by weight.

The oxidation catalyst of the invention may be prepared by applying a washcoat onto the surface of a substrate and/or by extrusion. The oxidation catalyst of the invention, including the zoned oxidation catalyst, can be manufactured by preparing one or more washcoats and applying it/them onto a substrate using methods known in the art (see, for example, our WO 99/47260, WO 2011/080525 and WO 2014/195685).

The oxidation catalyst of the invention may be an extruded oxidation catalyst where the HC catalytic material is part of (e.g. dispersed in) the substrate. Methods of manufacturing oxidation catalysts by extrusion are also known (see, for example, our WO 2011/092519).

In one embodiment, the HC catalytic material is disposed or supported on the substrate (e.g. the HC catalytic material is applied to a surface of the substrate in a washcoat). The HC catalytic material may be disposed directly on to the substrate (i.e. the HC catalytic material is in contact with a surface of the substrate).

The oxidation catalyst may comprise a total loading of the HC catalytic material of 0.3 to 5.0 g in$^{-3}$, preferably 0.4 to 3.8 g in$^{-3}$, still more preferably 0.5 to 3.0 g in$^{-3}$ (e.g. 1 to 2.75 g in$^{-3}$ or 0.75 to 1.5 g in$^{-3}$), and even more preferably 0.6 to 2.5 g in$^{-3}$ (e.g. 0.75 to 2.3 g in$^{-3}$).

The oxidation catalyst may comprise a first region and a second region. The second region comprises, or may consist essentially of, the HC catalytic material.

The first region comprises, or may consist essentially of, a catalytic material for oxidising ammonia ($NH_3$). The abbreviation "CM-AM" is used herein to represent the expression "catalytic material for oxidising ammonia".

In principle, the any suitable formulation for oxidising ammonia in an exhaust gas produced by an internal combustion engine, particularly an exhaust gas produced by a stoichiometric NG engine, can be used as the CM-AM. The CM-AM preferably oxidises $NH_3$ into $N_2$ (e.g. with high selectivity).

It is preferred that the CM-AM is suitable for use as an ammonia oxidation catalyst for rich-burn engine applications operating at high temperatures. Compared to lean-burn conditions, a rich burn condition imposes additional requirements on a catalyst component. Namely, besides having good activity and excellent thermal stability, the CM-AM catalyst needs to be durable after being exposed to a reducing atmosphere at high temperature.

Typically, the CM-AM and the HC catalytic material are different (i.e. the composition of the CM-AM is different to the composition of the HC catalytic material).

In a first CM-AM embodiment, the CM-AM may comprise, or consist essentially of, a molecular sieve and optionally a transition metal. The transition metal is preferably supported on the molecular sieve. Thus, the CM-AM may comprise, or consist essentially of, a molecular sieve supporting a transition metal.

Typically, the molecular sieve is microporous.

Similar materials to the CM-AM described below have been used in lean burn applications for selective catalytic reduction (SCR) of $NO_x$ with $NH_3$. However, such SCR catalysts are not normally used as oxidation catalysts to oxidize $NH_3$ to form $N_2$ and $H_2O$.

The molecular sieve is preferably a small pore molecular sieve. As explained above, a small pore molecular sieve typically has a maximum ring size of eight tetrahedral atoms.

When the molecular sieve is a small pore molecular sieve, then the small pore molecular sieve may have three-dimensional dimensionality (i.e. a pore structure which is interconnected in all three crystallographic dimensions) or two-dimensional dimensionality. The small pore molecular sieve may consist of a molecular sieve having three-dimensional dimensionality. The small pore molecular sieve may consist of a molecular sieve having two-dimensional dimensionality.

The molecular sieve may be an aluminosilicate molecular sieve, a metal-substituted aluminosilicate molecular sieve, an aluminophosphate (AlPO) molecular sieve, a metal-substituted (MeAlPO) molecular sieve, a silico-aluminophosphate (SAPO) molecular sieve or a metal-substituted silico-aluminophosphate (MeAPSO) molecular sieve. It is preferred that the molecular sieve is an aluminosilicate molecular sieve or a silico-aluminophosphate (SAPO) molecular sieve. More preferably, the molecular sieve is an aluminosilicate molecular sieve (i.e. the molecular sieve is a zeolite).

When the molecular sieve is a small pore molecular sieve, then preferably the small pore molecular sieve has a framework type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON. More preferably, the molecular sieve has a framework type selected from CHA, LEV, ERI, DDR, KFI, EAB, PAU, MER, AEI, GOO, YUG, GIS, VNI and AEI.

When the molecular sieve is a small pore molecular sieve, then the small pore molecular sieve may comprise, or consist essentially of, a disordered framework selected from the group consisting of ABC-6, AEI/CHA, AEI/SAV, AEN/UEI, AFS/BPH, BEC/ISV, beta, faujasite, ITE/RTH, KFI/SAV, lovdarite, montesommaite, MTT/TON, pentasils, SBS/SBT, SSF/STF, SSZ-33, and ZSM-48.

It is preferred that the small pore molecular sieve has a framework type selected from the group consisting of CHA, LEV, ERI, AFX, AEI, UFI, and DDR. Even more preferably, the small pore molecular sieve has a framework type selected from the group consisting of CHA and AEI.

When the small pore molecular sieve has a CHA framework type, then preferably the small pore molecular sieve is selected from the group consisting of chabazite, SAPO-34, AlPO-34, SAPO-47, ZYT-6, CAL-1, SAPO-40, SSZ-62 and SSZ-13.

When the small pore molecular sieve has an AEI framework type, then preferably the small pore molecular sieve is selected from the group consisting of AlPO-18, SAPO-18, SIZ-8 and SSZ-39.

The small pore molecular sieve may have a mixed phase composition. It is preferred that the mixed phase composition is an AEI/CHA-mixed phase composition. When the small pore molecular sieve has an AEI/CHA-mixed phase composition, then typically the weight ratio of AEI to CHA is from about 5:95 to about 95:5 (e.g. about 5:95 to about 40:60), preferably about 60:40 to 40:/60.

In general, the molecular sieve may have a SAR of from 2 to 300, preferably from 4 to 200, and more preferably from 8 to 150. The molecular sieve is typically an aluminosilicate molecular sieve, a metal-substituted aluminosilicate molecular sieve, a silico-aluminophosphate (SAPO) molecular sieve or a metal-substituted silico-aluminophosphate (MeAPSO) molecular sieve, preferably an aluminosilicate molecular sieve or a silico-aluminophosphate (SAPO) molecular sieve, more preferably an aluminosilicate molecular sieve (i.e. the molecular sieve is a zeolite).

The CM-AM may comprise a transition metal supported on the molecular sieve. The transition metal may be selected from the group consisting of chromium (Cr), manganese (Mn), iron (Fe), cobalt (Co), cerium (Ce), nickel (Ni), copper (Cu), zinc (Zn), gallium (Ga), molybdenum (Mo), silver (Ag), indium (In), ruthenium (Ru), rhodium (Rh), palladium (Pd), rhenium (Re), iridium (Ir), platinum (Pt), tin (Sn), and a combination of any two or more thereof. It is preferred that the transition metal is selected from chromium (Cr), cerium (Ce), manganese (Mn), iron (Fe), cobalt (Co), nickel (Ni), copper (Cu), and a combination of any two or more thereof. Even more preferably, the transition metal is copper.

It may be preferable that the CM-AM does not comprise ruthenium (Ru), rhodium (Rh), palladium (Pd), rhenium (Re), iridium (Ir) or platinum (Pt), especially when the CM-AM comprises a molecular sieve, such as described above. More preferably, the CM-AM does not comprise a platinum group metal (PGM) or rhenium (Re).

It is preferred that the CM-AM comprises, or consists essentially of, a copper supporting molecular sieve, more preferably a copper supporting molecular sieve having a CHA (e.g. Cu-supported SAPO-34) or AEI framework type.

When the CM-AM comprises, or consists essentially of, a molecular sieve and a transition metal, then typically the CM-AM has a total amount of the transition of from 0.01 to 20 wt % (e.g. 0.2 to 4 wt % or 0.5 to 3 wt %), preferably from 2 to 8 wt %, and more preferably from 2.5 to 6 wt % (e.g. based on the total weight of the molecular sieve and the transition metal). As understood by a person skilled in the art, the total amount of the transition metal that can be included in the molecular sieve may depend on a number of factors including, for example, the type and acidity of the molecular sieve utilized.

The transition metal is supported on the molecular sieve. The term "supported" in this context refers to a transition metal that is associated with the molecular sieve. Typically, the transition metal is associated (e.g. as an ion-association or as a covalent association) with the molecular sieve. Some of the transition metal may be located insides the pores of the molecular sieve.

The CM-AM may have at least 1% by weight (i.e. of the amount of transition metal of the CM-AM) of the transition metal located inside pores of the molecular sieve, preferably at least 5% by weight, more preferably at least 10% by weight.

In a second CM-AM embodiment, the CM-AM comprises, or consists essentially of, platinum and a siliceous support. Typically, the platinum is supported on the siliceous support. The siliceous support is a support with low ammonia storage, namely a support that stores less than 0.001 mmol $NH_3$ per $m_3$ of support.

The siliceous support typically comprises silica or a zeolite. It is preferred that the siliceous support comprises, or consists essentially of, a zeolite.

The term "supported" in the expression "platinum is supported on the siliceous support", particularly in the context of a siliceous support comprising a zeolite, refers to platinum that is associated with the zeolite. Typically, the platinum is associated (e.g. as an ion-association or as a covalent association) with the zeolite. Some or all of the platinum metal may be located insides the pores of the zeolite.

Typically, the zeolite has a SAR of at least 100, preferably at least 200, more preferably at least 250, such as at least 300, particularly at least 400, even more preferably at least 500, such as at least 700, and still more preferably at least 1000.

The zeolite may be a siliceous zeolite, such as a pure silica zeolite. As explained above, a siliceous zeolite or pure silica zeolite has a framework comprising, or consisting essentially of, $SiO_4$ tetrahedra.

When the siliceous support comprises a zeolite, then preferably the zeolite has a framework type selected from the group consisting of AEI, ANA, ATS, BEA, CDO, CFI, CHA, CON, DDR, ERI, FAU, FER, GON, IFR, IFW, IFY, IHW, IMF, IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, and VNI. More preferably, the zeolite has a framework type selected from the group consisting of BEA, CDO, CON, FAU, MEL, MFI and MVWV, even more preferably the framework type is selected from the group consisting of BEA and MFI, particularly MFI.

In the second CM-AM embodiment, the CM-AM may comprise a total amount of platinum, preferably a total amount of the platinum supported on the siliceous support, of 0.01 to 10 wt %, preferably 0.1 to 5 wt %, such as 0.1 to 2 wt % (e.g. 0.1 to 1 wt %).

Generally, in the oxidation catalyst of the invention, the second region is arranged to contact the exhaust gas after (e.g. most of) the exhaust gas has contacted and/or passed through the first region.

The first region may be a first layer or a first zone.

The second region may be a second layer or a second zone.

The oxidation catalyst may therefore comprise a first layer or zone and a second layer or zone. The second layer or zone may comprise, or consist of, the CM-AM. The first layer or zone may comprise, or consist of, the HC catalytic material.

In a first oxidation catalyst arrangement, the first region is a first zone and the second region is a second zone. It is preferred that the second zone is disposed or supported at or near an outlet end of the substrate. More preferably, the first zone is disposed or supported at or near an inlet end of the substrate. The second zone contacts the exhaust gas after the exhaust gas has contacted and/or passed through first zone. See, for example, the arrangement shown in FIG. 2.

The first zone and/or the second zone may be disposed directly onto the substrate (i.e. each of the first zone and/or the second zone is in direct contact with a surface of the substrate).

The first zone and/or the second zone may be disposed or supported on a third region.

The first zone and the second zone may be arranged to form a single layer.

Figure 3:
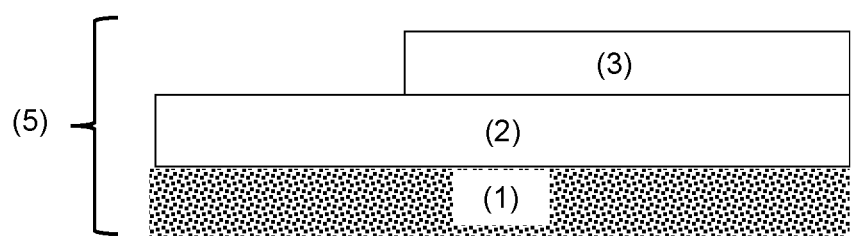

In a second oxidation catalyst arrangement, the first region is a first layer and the second region is a second zone. It is preferred that the second zone is disposed or supported (e.g. directly disposed or supported) on the first layer. More preferably, the second zone is disposed or supported (e.g. directly disposed or supported) on the first layer at or near an outlet end of the substrate. See, for example, the arrangement shown in FIG. 3.

The first layer may be disposed directly onto the substrate (i.e. the first layer is in direct contact with a surface of the substrate). Additionally or alternatively, the first layer may be disposed directly onto a third region.

Figure 4:
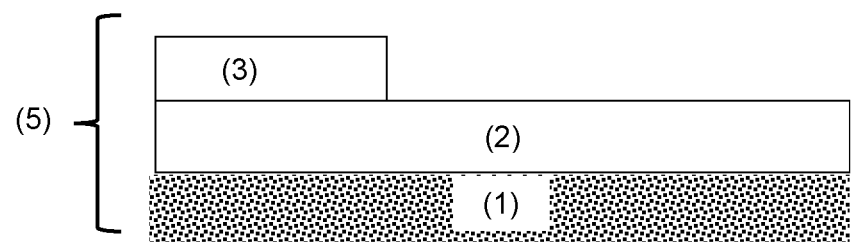
Figure 5:
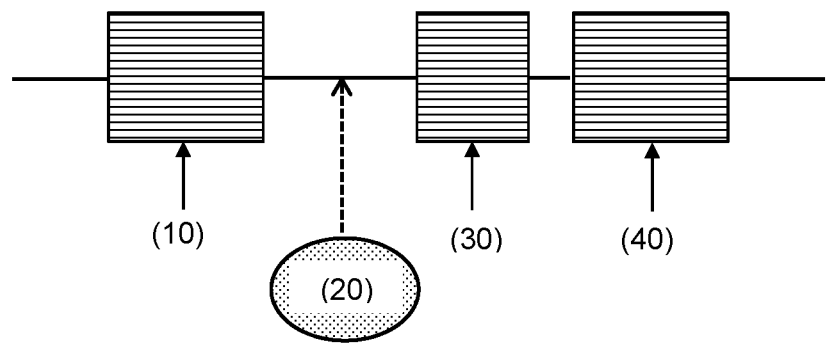
FIG. 5 shows an exhaust system comprising an oxidation catalyst (40) of the invention, which is downstream of an ammonia oxidation catalyst (30). A means for introducing additional oxygen-containing gas (20) may be located upstream of the ammonia oxidation catalyst (30). A three way conversion catalyst (10) is located upstream of the ammonia oxidation catalyst (30) and upstream of any optional means for introducing additional oxygen-containing gas (20).
Figure 6:
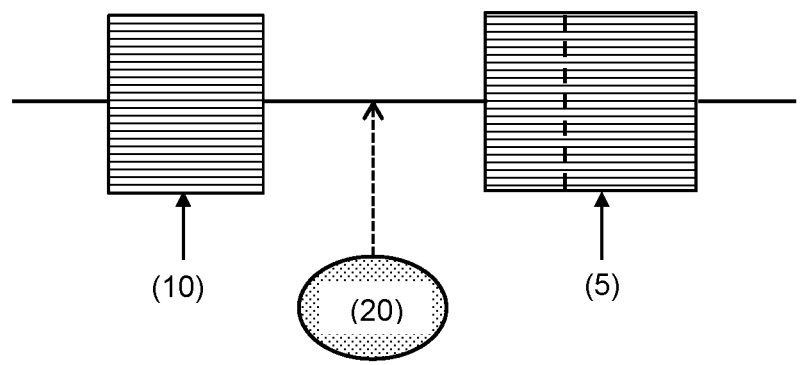
FIG. 6 shows an exhaust system comprising an oxidation catalyst (5) of the invention, such as an oxidation catalyst as shown in FIGS. 2 to 4. A means for introducing additional oxygen-containing gas (20) may be located upstream of the oxidation catalyst (5). A three way conversion catalyst (10) is located upstream of the oxidation catalyst (5) and upstream of any optional means for introducing additional oxygen-containing gas (20).

In a third oxidation catalyst arrangement, the first region is a first zone and the second region is a second layer. It is preferred that the first zone is disposed or supported (e.g. directly disposed or supported) on the second layer. More preferably, the first zone is disposed or supported (e.g. directly disposed or supported) on the first layer at or near an outlet end of the substrate. See, for example, the arrangement shown in FIG. 4.

The second layer may be disposed directly onto the substrate (i.e. the second layer is in direct contact with a surface of the substrate). Additionally or alternatively, the second layer may be disposed directly onto a third region.

In general, and particularly in the second oxidation catalyst arrangement, the first layer typically extends for an entire length (i.e. substantially an entire length) of the substrate, particularly the entire length of the channels of a substrate monolith.

Generally, and particularly in the third oxidation catalyst arrangement, the second layer typically extends for an entire length (i.e. substantially an entire length) of the substrate, preferably the entire length of the channels of a substrate monolith.

Generally, and particularly in the first and second oxidation catalyst arrangements, the second zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In general, and particularly in the first and third oxidation catalyst arrangements, the first zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Substrates for supporting oxidation catalysts for treating exhaust gases, such as from internal combustion engines, are well known in the art.

The substrate typically has a plurality of channels (e.g. for the exhaust gas to flow through).

Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith), preferably a honeycomb monolith. Such monoliths are well-known in the art.

The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

In general, the substrate may be a flow-through substrate or a filtering substrate. When the substrate is a monolith, then the substrate may be a flow-through monolith or a filtering monolith.

A flow-through substrate typically comprises a honeycomb substrate (e.g. a metal or ceramic honeycomb substrate) having a plurality of channels extending therethrough, which channels are open at both ends.

A filtering substrate generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the substrate is a filtering substrate, it is preferred that the filtering substrate is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytic material to the exhaust gas.

In the oxidation catalyst of the invention, the HC catalytic material may be disposed on a channel wall of the substrate and/or within a channel wall of the substrate (e.g. when the uncoated substrate is porous). When the oxidation catalyst comprises a CM-AM, then the CM-AM may be disposed on a channel wall of the substrate and/or within a channel wall of the substrate (e.g. when the uncoated substrate is porous).

The oxidation catalyst of the invention may be an extruded oxidation catalyst. Thus, the substrate is an extruded solid body comprising either the HC catalytic material or the AM-CM.

In a first extruded oxidation catalyst embodiment, the HC catalytic material is part of (e.g. dispersed in) the substrate. When the oxidation catalyst comprises a CM-AM, then the CM-AM is typically disposed on the substrate (e.g. disposed on a channel wall of the substrate).

When the HC catalytic material is dispersed in the substrate (e.g. the oxidation catalyst is an extruded product), then it may be possible to rapidly desulfate the oxidation catalyst and it may have excellent on-stream stability (e.g. good water and oxygen tolerance) in comparison to an oxidation catalyst that has been manufactured by washcoating the HC catalytic material onto the substrate.

In a second extruded oxidation catalyst embodiment, the CM-AM is part of (e.g. dispersed in) the substrate. The HC catalytic material is typically disposed on the substrate (e.g. disposed on a channel wall of the substrate).

In general, the extruded solid body typically comprises, or consists essentially of, (i) 5 to 95% by weight of either the HC catalytic material or the CM-AM and (ii) 5 to 95% of at least one component selected from the group consisting of a binder/matrix component, an inorganic fibre and a combination thereof.

The binder/matrix component can be selected from the group consisting of cordierite, a nitride, a carbide, a boride, a spinel, a refractory metal oxide, lithium aluminosilicate, zircon and mixtures of any two or more thereof.

The refractory metal oxide may be selected from the group consisting of optionally doped alumina, silica, titania, zirconia, and mixtures of any two or more thereof. Suitable sources of silica, such as clays, are described in US 2014/0065042 A1.

The inorganic fibre may be selected from the group consisting of a carbon fibre, a glass fibre, a metal fibre, a boron fibre, an alumina fibre, a silica fibre, a silica-alumina fibre, a silicon carbide fibre, a potassium titanate fibre, an aluminium borate fibre and a ceramic fibre.

When the HC catalytic material or the CM-AM is dispersed in the substrate (e.g. the substrate is an extruded solid body comprising the catalytic material), then typically the substrate has a porosity of 35 to 75%. The porosity of the substrate can be determined using conventional methods known in the art, such as mercury porosimetry.

Also provided by the invention is an exhaust system for treating an exhaust gas produced by a stoichiometric natural gas (NG) engine. The exhaust system comprises an oxidation catalyst of the invention.

The exhaust system may further comprise an ammonia ($NH_3$) oxidation catalyst. The ammonia ($NH_3$) oxidation catalyst comprises a substrate and a catalytic material for oxidising ammonia ($NH_3$). The CM-AM may have a composition as described above, including the first CM-AM embodiment or the second CM-AM embodiment.

The substrate of the ammonia ($NH_3$) oxidation catalyst may be a substrate as defined above. In particular, the substrate is a flow-through substrate or a filtering substrate, such as a wall-flow filter. The substrate may be a monolith. When the substrate is a monolith, then the substrate may be a flow-through monolith or a filtering monolith. It is preferred that the substrate is a flow-through substrate.

The CM-AM may be disposed on the substrate or be part of (i.e. dispersed in) the substrate (e.g. the ammonia ($NH_3$) oxidation catalyst is an extruded ammonia ($NH_3$) oxidation catalyst). It is preferred that the CM-AM is disposed on the substrate (e.g. disposed on a channel wall of the substrate).

The ammonia ($NH_3$) oxidation catalyst is disposed upstream of the oxidation catalyst of the invention. It is preferred that the ammonia ($NH_3$) oxidation catalyst is disposed directly upstream (i.e. without any intervening emissions control device) of the oxidation catalyst. Thus, an outlet end of the ammonia ($NH_3$) oxidation catalyst is directly coupled to an inlet end of the oxidation catalyst.

The oxidation catalyst may comprise a first region comprising a catalytic material for oxidising ammonia ($NH_3$) and a second region comprising a catalytic material for oxidising hydrocarbon (HC), as described above. However, it is preferred that the oxidation catalyst comprises a catalytic material for oxidising hydrocarbon (HC), and does not comprise a catalytic material for oxidising ammonia ($NH_3$), such as the first region comprising a catalytic material for oxidising ammonia ($NH_3$).

disposed upstream of the oxidation catalyst, wherein the ammonia ($NH_3$) oxidation catalyst comprises a substrate and a catalytic material for oxidising ammonia ($NH_3$) disposed on the substrate, and optionally wherein the ammonia oxidation catalyst is disposed downstream of the means for introducing an oxygen-containing gas into the exhaust system.

As a general feature of the exhaust system of the invention, the exhaust system may further comprise means for introducing an oxygen-containing gas into the exhaust gas. The term "means for introducing hydrocarbons into the exhaust gas" is referred to herein by the abbreviated expression "O-means". The term "introducing an oxygen-containing gas into the exhaust gas" refers to the additional inclusion of an oxygen-containing gas into the exhaust gas (i.e. in addition to any oxygen-containing gas or gases that may be present in the exhaust gas produced by the natural gas engine and optionally outlet from a three-way conversion catalyst).

The O-means is preferably disposed upstream of the oxidation catalyst of the invention. Thus, the O-means is able to introduce the oxygen-containing gas into the exhaust gas before it enters an inlet end of the oxidation catalyst.

In general, the oxygen-containing gas may comprise at least 0.1% oxygen, preferably at least 1% oxygen, more preferably at least 5% oxygen, and even more preferably at least 15% oxygen. The oxygen-containing gas may be air (e.g. ambient air). T The O-means is typically an injector for introducing an oxygen-containing gas into the exhaust gas.

The oxygen-containing gas may be introduced in gaseous form directly into the exhaust gas or the gaseous form of the oxygen-containing gas may be generated in situ.

The injector may be a liquid injector suitable for introducing a solution comprising a precursor of the oxygen-containing gas into the exhaust gas. Such an injector may be fluidly linked to a source (e.g. a tank) of a precursor of the oxygen-containing gas.

Typically, the injector atomizes the precursor, or a solution comprising the precursor, upon injection into the exhaust gas, such as by spraying the precursor or the solution comprising the precursor.

In general, the O-means is configured to introduce the oxygen-containing gas into the exhaust gas upstream of the oxidation catalyst of the invention. When the exhaust system comprises an ammonia oxidation catalyst, then preferably the O-means is disposed upstream of the ammonia oxidation catalyst (e.g. the O-means is upstream of both the ammonia oxidation catalyst and the oxidation catalyst). Thus, the O-means is able to introduce the oxygen-containing gas into the exhaust gas before it enters an inlet end of the ammonia oxidation catalyst.

Generally, the O-means is configured to controllably introduce an amount of the oxygen-containing gas into the exhaust gas upstream of the oxidation catalyst, and optionally upstream of the ammonia oxidation catalyst. It is preferred that O-means is configured to controllably introduce an amount of the oxygen-containing gas into the exhaust gas to produce a concentration of at least 0.1% oxygen in the exhaust gas, preferably upstream of the ammonia oxidation catalyst. In principle, any O-means known in the art can be used to provide this function.

When the O-means is an injector, then preferably the injector is configured to controllably inject an amount of the oxygen-containing gas into the exhaust gas.

In general, the O-means is electronically coupled to an engine management system. The engine management system may be configured to trigger the O-means to inject an oxygen-containing gas into the exhaust gas.

The exhaust system of the invention may further comprise an exhaust gas sensor.

An exhaust gas sensor may be disposed downstream of the oxidation catalyst (e.g. at or after an outlet of the oxidation catalyst).

When the exhaust system comprises an ammonia oxidation catalyst, then an exhaust gas sensor may be disposed downstream of the ammonia oxidation catalyst and upstream of the oxidation catalyst.

Generally, the engine management system is coupled to a sensor in the exhaust system. The sensor may be used to monitor the status of the oxidation catalyst and/or the ammonia oxidation catalyst.

The sensor may be a hydrocarbons (HCs) sensor (e.g. to monitor the content of hydrocarbons (HCs) of the exhaust gas at the outlet of the oxidation catalyst). Additionally or alternatively, the sensor may be an ammonia ($NH_3$) sensor (e.g. to monitor the content of ammonia ($NH_3$) of the exhaust gas at the outlet of the ammonia oxidation catalyst or the outlet of the oxidation catalyst).

The exhaust system of the invention may comprise a three-way conversion (TWC) catalyst. TWC catalysts suitable for use in the invention are known in the art. Such TWC catalysts are typically used with gasoline, spark-ignition engines.

The substrate of the TWC catalyst may be a substrate as defined above. In particular, the substrate is a flow-through substrate or a filtering substrate, such as a wall-flow filter. The substrate may be a monolith. When the substrate is a monolith, then the substrate may be a flow-through monolith or a filtering monolith.

When the substrate is filtering substrate, such as a wall-flow filter, then the TWC catalyst may be referred to as a gasoline particulate filter (GPF) or a gasoline soot filter (GSF). GPFs/GSFs are known in the art.

In general, the three-way conversion (TWC) catalyst is disposed upstream of the oxidation catalyst. Thus, an outlet end of the TWC catalyst is coupled to an inlet end of the oxidation catalyst.

When the exhaust system comprises an ammonia oxidation catalyst, then preferably the TWC catalyst is disposed upstream of the ammonia oxidation catalyst. Thus, an outlet end of the TWC catalyst is coupled to an inlet end of the ammonia oxidation catalyst.

When the exhaust system comprises an O-means, then the TWC catalyst is disposed upstream of the O-means. Typically, the O-means is coupled to a conduit of the exhaust system between an outlet of the TWC catalyst and an inlet of the ammonia oxidation catalyst.

The TWC catalyst is typically directly coupled to an exhaust gas outlet of the stoichiometric NG engine. In such an arrangement, there is no intervening emissions control device between the exhaust gas outlet of the stoichiometric NG engine and the TWC catalyst. The exhaust gas produced by the stoichiometric NG engine passes directly to the TWC catalyst in the exhaust system.

Another aspect of the invention relates to an apparatus comprising a stoichiometric natural gas (NG) engine.

The apparatus is typically a vehicle, which comprises an internal combustion engine.

The stoichiometric natural gas (NG) engine is typically a dedicated NG engine (i.e. purpose built for using natural gas as a fuel) or a modified engine (i.e. an engine, such as a conventional gasoline or diesel engine, modified to use natural gas as a fuel). The modified engine is typically configured to use natural gas as a fuel or the modified engine comprises hardware to allow the use of natural gas as a fuel. This hardware is generally not present in conventional gasoline or diesel engines.

The stoichiometric natural gas (NG) engine may be a liquefied natural gas (LNG) engine or a compressed natural gas engine, preferably the NG engine is a compressed natural gas (CNG) engine.

The internal combustion engine may be a spark ignition natural gas (SING) engine or a direct injection natural gas (DING) engine. SING engines utilise the Otto cycle, whereas DING engines utilise the Diesel cycle.

The internal combustion engine may be a SING engine. The SING engine may be a lean burn SING engine or a stoichiometric SING engine. It is preferred that the SING engine is a lean burn SING engine.

The vehicle may be a light-duty vehicle (LDV), such as defined in US or European legislation. A light-duty vehicle typically has a weight of <2840 kg, more preferably a weight of <2610 kg.

In the US, a light-duty vehicle (LDV) refers to a vehicle having a gross weight of ≤8,500 pounds (US lbs). In Europe, the term light-duty vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty vehicle (HDV), such as a vehicle having a gross weight of >8,500 pounds (US lbs), as defined in US legislation.

A further aspect of the invention relates to a method of treating an exhaust gas produced by a stoichiometric natural gas (NG) engine. The method comprises passing an exhaust gas produced by the stoichiometric NG engine through an oxidation catalyst of the invention or an exhaust system of the invention. In particular, the invention relates to a method of treating hydrocarbons (e.g. methane and/or ethane) in an exhaust gas produced by the stoichiometric NG engine.

It is preferred that the method is a method of treating an exhaust gas produced treating an exhaust gas produced by a stoichiometric natural gas (NG) engine comprising the steps of:

(a) passing an exhaust gas produced by the stoichiometric natural gas (NG) engine through a three-way conversion (TWC) catalyst, such as a TWC catalyst described above; then (b) passing the exhaust gas through an ammonia oxidation catalyst, such as described above; and then (c) passing the exhaust gas through an oxidation catalyst of the invention as described above.

Step (b) typically involves passing the exhaust gas outlet from the TWC catalyst through the ammonia oxidation catalyst.

Step (c) typically involves passing the exhaust gas outlet from the ammonia oxidation catalyst through the oxidation catalyst.

The method of the invention may further comprise a step of introducing an oxygen-containing gas into an exhaust gas, such as by using the O-means described above. This step preferably comprises introducing an oxygen-containing gas into an exhaust gas outlet from the TWC catalyst when the exhaust gas comprises $NH_3$, and preferably when lambda <1, (i.e. to selectively oxidize at least a portion of the $NH_3$ to $N_2$).

In general, the oxygen-containing gas may be introduced to produce an exhaust gas having a molar ratio of $O_2:NH_3$ of at least about 1:1, preferably from about 2:1 to about 1:1.

Definitions

The expression "molecular sieve" as used herein refers to a metastable material containing tiny pores of a precise and uniform size. Conventionally, the framework of a molecular sieve may be defined using a Framework Type Code (FTC) of the International Zeolite Association (at http:/www.iza-online.org/). Any definition of a molecular sieve by its Framework Type Code preferably includes the "Type Material" and any and all of the isotypic framework materials defined by that FTC. (The "Type Material" is the species first used to establish the framework type.) For the avoidance of doubt, unless otherwise made clear, reference herein to a molecular sieve by name (e.g. "chabazite") is to the molecular sieve material per se (in this example the naturally occurring type material chabazite) and not to any other material designated by the Framework Type Code to which the individual molecular sieve may belong (i.e. some other isotypic framework material).

The acronym "SAR" as used herein stands for silica to alumina ratio and refers to a molar ratio of silica to alumina.

The expression "treating" as used herein with reference to methane/ethane or an exhaust gas containing methane/ethane refers to oxidising methane/ethane. Methane/ethane is/are "treated" because it is converted by oxidation to water ($H_2O$) and carbon dioxide ($CO_2$), when complete oxidation occurs.

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "upstream" as used herein with reference to the location of a first device in relation to a second device (the device may, for example, be an oxidation catalyst, a turbocharger or an emissions control device) refers to an arrangement where the exhaust gas outlet of the first device is coupled (e.g. by a conduit) to the exhaust gas inlet of the second device.

The term "downstream" as used herein with reference to the location of a first device in relation to a second device refers to an arrangement where the exhaust gas inlet of the first device is coupled (e.g. by a conduit) to the exhaust gas outlet of the second device.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "about" as used herein with reference to an end point of a numerical range includes the exact end point of the specified numerical range. Thus, for example, an expression defining a parameter as being up to "about 0.2" includes the parameter being up to and including 0.2.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

EXAMPLES

The invention will now be illustrated by the following non-limiting examples.

Example 1

A powder sample of siliceous BEA zeolite having 0.13 mol % of heteroatom was impregnated with a solution of palladium nitrate and platinum nitrate by a conventional incipient wetness technique. After impregnation, the zeolite was dried at 100° C. in air in a static oven for 5 hours and then calcined in air at 500° C. in a static oven for 2 hours. The resulting zeolite catalyst powder (i.e. PtPd/BEA) contained 0.15 wt % Pt and 2.85 wt % of Pd.

Example 2

The method in Example 1 was repeated using a siliceous BEA zeolite having 1.10 mol % of heteroatom instead of 0.13 mol % to produce a zeolite catalyst powder (i.e. PtPd/BEA) containing 0.15 wt % Pt and 2.85 wt % of Pd.

Example 3

The method in Example 1 was repeated using a siliceous BEA zeolite having 6.67 mol % of heteroatom instead of 0.13 mol % to produce a zeolite catalyst powder (i.e. PtPd/BEA) containing 0.15 wt % Pt and 2.85 wt % of Pd.

Examples 4 to 11

A series of zeolite catalysts (PtPd zeolite) were prepared using the method of Example 1. The siliceous zeolite and the amount of heteroatom in each zeolite that was present in each catalyst are shown in Table 1 below.

Examples 12 and 13

The catalysts of Examples 12 and 13 were prepared using the method of Example 1, except that a powder sample of alumina (Example 12) or silica (Example 13) was used instead of the siliceous zeolite.

TABLE 1

| Example No. | Support | Amount of heteroatom (mol %) |
|---|---|---|
| 4* | BEA (zeolite) | 6.67 |
| 5* | BEA (zeolite) | 1.96 |
| 6* | BEA (zeolite) | 1.10 |
| 7 | BEA (zeolite) | 0.13 |
| 8* | MFI (zeolite) | 2.44 |

TABLE 1-continued

| Example No. | Support | Amount of heteroatom (mol %) |
|---|---|---|
| 9 | MFI (zeolite) | 0.11 |
| 10* | FAU (zeolite) | 0.83 |
| 11* | FAU (zeolite) | 0.24 |
| 12* | $Al_2O_3$ | — |
| 13* | $SiO_2$ | — |

*indicates that the Example is for comparative purposes

Examples 14 and 15

Zeolite catalysts (PtPd zeolite) were prepared using the method of Example 1, except that either an MFI-1 zeolite (Example 14) or an MFI-2 zeolite (Example 15) was used instead of BEA zeolite. The MFI-1 and MFI-2 zeolites that were used to prepare the catalysts are commercially available. The properties of the zeolite catalysts are shown in Table 2.

TABLE 2

| Property | Example 14 MFI-1 | Example 15 MFI-2 |
|---|---|---|
| Framework | MFI | MFI |
| Amount of heteroatom (mol %) | 0.094 | 0.094 |
| SAR | 2120 | 2120 |
| Cation type | H | H |
| BET (m²/g) | 310 | 310 |
| Crystal size (μm) | 2 × 5 | 2 × 5 |

Experimental Results
Characterisation of Silanol Groups

Figure 2:
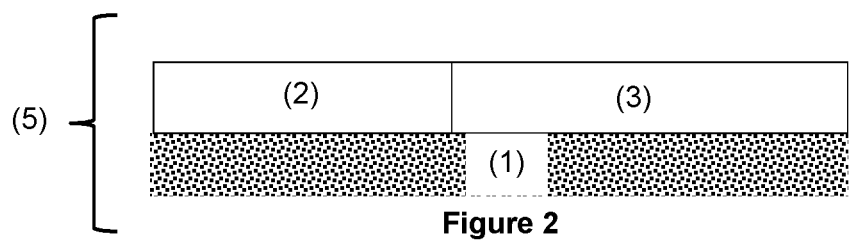
FIGS. 2 to 4 show oxidation catalysts of preferred aspects of the invention. In these Figures, the left hand side of the oxidation catalyst is the inlet end and the right hand side is the outlet end.

The presence of a significant amount of silanol groups was determined by FTIR (Fourier Transformed Infrared) spectroscopy. 10 mg of each powdered zeolite catalyst (PtPd zeolite) was pressed into a self-supporting wafer. IR spectra for each sample were then obtained in transmission mode with a Thermo Nicole 670 FTIR spectrometer. The spectra resolution was 1 cm$^{-1}$, and each reported spectrum was averaged over 20 consecutive spectra. The spectra of the catalysts (zeolite impregnated with PtPd) and the zeolite support materials prior to impregnation with Pt and Pd are shown in FIGS. 1 and 2.

In the —OH stretching region (see FIG. 1), no bands are observed on MFI-1, indicating lack of hydroxyl groups on the zeolite. In contrast, several distinct features were identified on MFI-2 zeolite, including an intense and broad band centered at ~3425 cm$^{-1}$ and two small bands at 3695 and 3725 cm$^{-1}$. According to literature studies (J. Phys. Chem. 95 (1991), 872), the sharp bands at higher frequency may be assigned to isolated external silanol groups, and the broad band centred at 3425 cm$^{-1}$ may be assigned to hydrogen bonded silanol groups (e.g. silanol nest sites where the —OH groups are in close proximity).

The amount of silanol groups was determined by a K-uptake measurement as follows. Each zeolite was first calcined at 500° C. for 1 h prior to analysis. 0.5 g of each zeolite is then placed in a beaker with 50 ml of 1N KCl solution and stirred on a hotplate at room temperature for one hour to facilitate the ion exchange. The zeolite is then filtered and washed with 1N KCl solution. The stirring/filtering/washing steps were then repeated twice and the resulting product was dried at 80° C. in air overnight. The sample was then analysed with ICP (elemental analysis) for K concentration. The amount of strongly adsorbed K$^+$ remaining on the zeolite is proportional to the amount of silanol groups in a theoretical 1:1 molar ratio. The amount of silanol groups in each catalyst is shown in Table 3 below.

TABLE 3

| Example No. | Amount of silanol groups (mmol/g) |
|---|---|
| 14 | 0.044 |
| 15 | 0.004 |

Examples 16 and 17

Zeolite catalysts (PtPd zeolite) were prepared using the method of Example 1, except that either an MFI zeolite having 0.09 mol % of heteroatom (Example 16) or a BEA zeolite having 0.13 mol % of heteroatom (Example 17) was used instead of the BEA zeolite in Example 1. The properties of the zeolite catalysts are shown in Table 4.

The amount of silanol groups was measured for Examples 16 and 17 using the K-uptake method described above.

TABLE 4

|  | Example 16 | Example 17 |
|---|---|---|
| Framework | MFI | BEA |
| Amount of heteroatom (mol %) | 0.09 | 0.13 |
| Amount of silanol groups (mmol/g) | 0.044 | 0.053 |

For the avoidance of any doubt, the entire content of any and all documents cited herein is incorporated by reference into the present application.

The invention claimed is:

1. An oxidation catalyst for treating an exhaust gas produced by a stoichiometric natural gas (NG) engine comprising:
   a substrate having an inlet end and an outlet end;
   a first region comprising a catalytic material for oxidizing ammonia (NH$_3$) to N$_2$; and
   a second region comprising a catalytic material for oxidizing hydrocarbon (HC);
   wherein:
   (a) the oxidation catalyst is positioned within the exhaust gas stream of the stoichiometric natural gas (NG) engine; and
   (b) the catalytic material for oxidizing ammonia (NH$_3$) comprises a transition metal supported on a siliceous support, wherein the siliceous support comprises a first small pore zeolite,
   (c) the catalytic material for oxidizing hydrocarbon (HC) comprises a platinum group metal (PGM) supported on a molecular sieve, wherein the molecular sieve has a framework comprising silicon, oxygen, and optionally germanium and a content of heteroatom T-atoms in a range of from 0.20 mol % or less relative to the total amount of framework atoms and contains at least 0.010 mmols of silanol groups per gram of molecular sieve, as determined by a K-uptake method or FTIR spectroscopy; and
   (d) the second region is arranged to contact the exhaust gas at the outlet end of the substrate and after contact of the exhaust gas with the first region.

2. The oxidation catalyst of claim 1, wherein the transition metal of the catalytic material for oxidizing ammonia comprises copper and the first small pore zeolite has a CHA or AEI framework.

3. The oxidation catalyst of claim 1, wherein the molecular sieve of the catalytic material for oxidizing hydrocarbon (HC) is a small pore molecular sieve.

4. The oxidation catalyst of claim 1, wherein the first small pore zeolite of the catalytic material for oxidizing ammonia (NH$_3$) is an aluminosilicate or a silico-aluminophosphate (SAPO).

5. The oxidation catalyst of claim 1, wherein the first small pore zeolite of the catalytic material for oxidizing ammonia (NH$_3$) has a CHA, LEV, ERI, DDR, KFI, EAB, PAU, MER, GOO, YUG, GIS, VNI, or AEI framework.

6. The oxidation catalyst of claim 1, wherein the first small pore zeolite has a silica to alumina ratio (SAR) in a range of from 2 to 300.

7. The oxidation catalyst of claim 1, wherein the transition metal of the catalytic material for oxidizing ammonia (NH$_3$) is chromium (Cr), cerium (Ce), manganese (Mn), iron (Fe), cobalt (Co), nickel (Ni), copper (Cu), or a combination of any two or more thereof.

8. The oxidation catalyst of claim 1, wherein the catalytic material for oxidizing hydrocarbon (HC) comprises a molecular sieve having a content of heteroatom T-atoms of about 0.12 mol % or less, relative to the total amount of framework atoms.

9. The oxidation catalyst of claim 8, wherein the heteroatom is aluminum (Al), boron (B), gallium (Ga), titanium (Ti), zinc (Zn), iron (Fe), vanadium (V) or a combination of any two or more thereof.

10. The oxidation catalyst of claim 1, wherein the catalytic material for oxidizing hydrocarbon (HC) comprises a molecular sieve that does not contain any heteroatom T-atoms.

11. The oxidation catalyst of claim 1, wherein the catalytic material for oxidizing hydrocarbon (HC) comprises a molecular sieve that is a second zeolite.

12. The oxidation catalyst of claim 1, wherein the catalytic material for oxidizing hydrocarbon (HC) comprises a molecular sieve, wherein the molecular sieve comprises at least 0.020 mmol of silanol groups per gram of molecular sieve, as determined by a K-uptake method or FTIR spectroscopy.

13. The oxidation catalyst of claim 1, wherein the platinum group metal is palladium (Pd) or a combination of platinum (Pt) and palladium (Pd).

14. The oxidation catalyst of claim 1, wherein the substrate is a flow-through substrate or a filtering substrate.

15. An exhaust system for treating an exhaust gas produced by a stoichiometric natural gas (NG) engine comprising an oxidation catalyst as defined in claim 1.

16. The exhaust system of claim 15 further comprising at least one of:
   (a) a means for introducing an oxygen-containing gas into the exhaust gas, wherein the means for introducing an oxygen-containing gas into the exhaust system is upstream of the oxidation catalyst; or
   (b) a three-way conversion (TWC) catalyst, wherein the three-way conversion (TWC) catalyst is disposed upstream of the oxidation catalyst.

17. An apparatus comprising a stoichiometric natural gas (NG) engine and an exhaust system as defined in claim 15.

18. The oxidation catalyst of claim 1, wherein the first small pore zeolite of the catalytic material for oxidizing ammonia (NH$_3$) has a SAR of at least 100.

19. The oxidation catalyst of claim 1, wherein the catalytic material for oxidizing ammonia (NH₃) and the catalytic material for oxidizing hydrocarbon (HC) are compositionally different.

20. The oxidation catalyst of claim 1, wherein the transition metal of the catalytic material for oxidizing ammonia (NH₃) comprises platinum.

21. The oxidation catalyst of claim 1, wherein the transition metal of the catalytic material for oxidizing ammonia (NH₃) does not include iridium, osmium, palladium, platinum, rhenium, rhodium, or ruthenium.

22. The oxidation catalyst of claim 1, wherein the molecular sieve of the catalytic material for oxidizing hydrocarbon (HC) is a zeolite having a CHA, CDO, DDR, MFI, MEL, MWW, AFI, BEA, CON, or FAU framework.

23. The oxidation catalyst of claim 1, wherein the first small pore zeolite of the catalytic material for oxidizing ammonia (NH₃) is a zeolite having a CHA, CDO, DDR, KFI, LEV, EAB, ERI, PAU, MER, AEI, GOO, YUG, GIS, VNI or AEI framework.

24. The oxidation catalyst of claim 1, wherein:
(a) the transition metal of the catalytic material for oxidizing ammonia (NH3) comprises copper but does not include iridium, osmium, palladium, platinum, rhenium, rhodium or ruthenium and the first small pore zeolite has a CHA or AEI framework;
(b) the molecular sieve of the catalytic material for oxidizing hydrocarbon (HC) is a small pore molecular sieve containing at least 0.010 mmol of silanol groups per gram of molecular sieve, as determined by a K-uptake method or FTIR spectroscopy; and
(c) the platinum group metal is palladium (Pd) or a combination of platinum (Pt) and palladium (Pd).

* * * * *